United States Patent [19]

Yamakoshi

[11] Patent Number: 4,781,420
[45] Date of Patent: Nov. 1, 1988

[54] HYDRAULIC BRAKE LOAD-SENSING PROPORTION VALVE WITH NOISE PREVENTION MEANS

[75] Inventor: Mutsuro Yamakoshi, Higashimatsuyama, Japan

[73] Assignee: Jidosha Kiki Co. Ltd., Japan

[21] Appl. No.: 109,462

[22] Filed: Oct. 15, 1987

[30] Foreign Application Priority Data

Oct. 27, 1986 [JP] Japan .................. 61-164494[U]

[51] Int. Cl.⁴ .................................. B60T 8/18
[52] U.S. Cl. .................... 303/9.69; 188/195; 303/22.8
[58] Field of Search ............ 303/22 R, 22 A, 6 C, 303/6 R, 23 R; 188/195, 349

[56] References Cited

U.S. PATENT DOCUMENTS

| | | | |
|---|---|---|---|
| 3,442,557 | 5/1969 | Oberthur | 303/22 R |
| 3,645,585 | 2/1972 | Deem et al. | 303/22 R |
| 3,684,329 | 8/1972 | Kawabe et al. | 303/22 R |
| 3,701,616 | 10/1972 | Kawai | 303/22 R |
| 3,840,280 | 10/1974 | Watanabe | 188/195 X |
| 3,891,280 | 6/1975 | Severinsson et al. | 303/22 R |
| 4,053,185 | 10/1977 | Carre | 303/22 R X |
| 4,062,597 | 12/1977 | Sawyer et al. | 303/22 R X |
| 4,101,176 | 7/1978 | Carre et al. | 303/22 R X |
| 4,325,581 | 4/1982 | Pickering | 303/22 R |
| 4,448,457 | 5/1984 | Pressaco | 303/22 R |
| 4,615,566 | 10/1986 | Perrin | 303/22 R X |
| 4,673,224 | 6/1987 | Schmoelzer | 303/22 R X |

Primary Examiner—Douglas C. Butler
Attorney, Agent, or Firm—McGlew & Tuttle

[57] ABSTRACT

In a load-sensing proportion valve including a control valve disposed in a hydraulic fluid passage extending from a master brake cylinder to rear-wheel brake cylinders, a plunger adapted to operate the conbtrol valve in response to the output fluid pressure from the master brake cylinder, and a stem formed integrally with a load-sensing lever and adapted to urge the plunger to open the control valve in accordance with a current load of a vehicle, a resilient member is interposed in a working position between the plunger and the stem so as to prevent the occurrence of noises from possible contacts between these plunger and stem, when set together.

5 Claims, 2 Drawing Sheets

HYDRAULIC BRAKE LOAD-SENSING PROPORTION VALVE WITH NOISE PREVENTION MEANS

FIELD OF THE INVENTION AND RELATED ART STATEMENT

The present invention relates in general to a load-sensing proportion valve of a vehicle for decreasing the output fluid pressure of a brake master cylinder at a predetermined rate proportional to a current load of the vehicle while in operation, and more particularly to a load-sensing proportion valve of a vehicle, which comprises a plunger adapted to actuate a control valve disposed in the hydraulic brake fluid passage and a stem adapted to effect an urging force upon the plunger in accordance with a current load of the vehicle so as to prevent the occurrence of noises from possible contact of these plunger and stem during the operation of the braking.

It is generally known that the hydraulic brake fluid pressure control systems of this type have in practice been disposed on way of the hydraulic brake fluid passage or line extending from a brake master cylinder to a rear wheel cylinder, and that such load-sensing proportion valves are adapted to provide a braking force in such a manner that an equal braking force may be relayed to the part of the rear wheels of the vehicle and to the part of the front wheels at an early stage of braking action with a relatively small degree of braking effort, and that a smaller braking force may be relayed to the part of the rear wheels than that for the part of the front wheels when with a braking force greater than a predetermined level, thereby preventing the occurrence of an undesired possible locking state on the part of the rear wheels. Also, in consideration of such a condition that the extent of braking effort which may give rise to the locking state on the part of the rear wheels would vary as the current load of the vehicle changes as in the case of a motor truck or the like, it is designed in practice such that the greater the current load of a vehicle is, the greater extent of braking effort at the commencing point of reducing a braking rate may be set on the part of rear wheels, while the smaller the current load of a vehicle is, the smaller extent of braking effort at this reducing point may be set, respectively.

More specifically, as typically shown in FIG. 2, a conventional load-sensing proportion valve assembly is generally constructed in such a manner that the valve assembly 1 is mounted fixedly upon a chassis frame 2 of a vehicle, with its load sensing lever 3 extending horizontally outwardly therefrom and with its free end being connected operatively to a bracket 5 on the axis side by way of a coiled tension spring 4. The load sensing lever 3 is mounted swingably about a pivotal point 9.

A plunger 6 is provided (see FIG. 2) which is mounted slidably along the inside of the load-sensing proportion valve assembly 1, and also seen defined an inlet pressure chamber 7 and an outlet pressure chamber 8 around the plunger 6. The inlet pressure chamber 7 is in communication with a brake master cylinder not shown by way of a connecting pipe 11, while the outlet pressure chamber 8 is in communication with a rear wheel brake cylinder not shown by way of a connecting pipe 12, respectively.

Above the outlet pressure chamber 8 is seen a valve chamber 13, which valve chamber is in communication with the inlet pressure chamber 7 by way of the communicating passage 14. The valve chamber 13 and the outlet pressure Chamber 8 are in intercommunication with each other through a valve seat opening 15, which valve seat opening 15 is closed operatively by way of a ball valve 16.

It is also seen that the upper end 6a of the plunger 6 is led in operative position into the valve seat opening 15 in such a manner that it may normally push the ball valve 16 upwardly against the urging force of a spring 17 so as to keep the valve seat opening 15 opened. The lower end 6b of the plunger 6 is held abutting upon a stem 8 which is formed integrally with the load sensing lever 3, and the plunger 6 is normally urged upwardly by the resilient force of the tension spring 4. On the other hand, the stepped or shouldered portion 6c formed on the top end of the plunger 6 is normally put in an abutting relationship upon the end wall portion 19 of the outlet pressure chamber 8 so that the pushing effort upon the plunger 6 is held by this end wall portion 19, accordingly.

Also, there are seen, in FIG. 2 a minor pressure receiving surface 22 and a major pressure receiving surface 23 defined in the outer circumferential parts of the plunger 6 facing opposingly the inlet pressure chamber 7 and the oulet pressure chamber 8, respectively, so as to produce such an effect that the plunger 6 is caused to be urged downwardly under the effect of a differential pressure from the difference in the areas of the pressure receiving surfaces when there is a pressure of the hydraulic brake fluid is introduced into the inlet pressure chamber 7.

Now, with the construction of the conventional load-sensing proportion valve assembly 1 as outlined hereinbefore, thus-produced pressure of the hydraulic brake fluid is relayed to the rear wheel brake cylinders through the fluid communicating passage 14, the valve chamber 13, the valve seat opening 15 and the outlet pressure chamber 8. On the other hand, there is introduced a fluid pressure equal with that of the inlet pressure chamber 7 into front wheel brake cylinders by way of other system of hydraulic fluid passages.

While the plunger 6 is urged downwardly against the resilient force of the tension spring 4 with the differential pressure produced from the difference in the areas of the minor and major pressure receiving surfaces 22 and 23, the hydraulic fluid at the same pressure as that for the front wheel brake cylinders is supplied to the rear wheel brake cylinders till the ball valve 16 is closed under the resilient force of the spring 17. When there is a certain degree of increase in pressure of the hydraulic fluid within the inlet pressure chamber 7, the ball valve 16 is then closed, and thereafter, the plunger 6 is caused to be moved upwardly and downwardly in accordance with a differential pressure to be built up between the major and minor pressure receiving surfaces 22 and 23 in an operating cycle such that an increase in the fluid pressure within the inlet pressure chamber 7 causes the plunger 6 to be shifted upwardly, which will then open the ball valve 16, and which state of the ball valve will further cause the plunger 6 to be shifted downwardly. This will then result in a reduction of the hydraulic fluid pressure within the inlet pressure chamber 7 at a predetermined rate, which pressure thus-reduced is to be introduced to the outlet pressure chamber 8, hence into the rear wheel brake cylinders, accordingly.

Now referring to FIG. 3 which is a graphic representation showing the mutual relationship of pressures within the inlet and outlet pressure chambers 7 and 8 of a load-sensing proportion valve mechanism, there is shown a typical function such that there occurs decrease in pressure at the point A when the vehicle has no freight, and that there starts an effect of pressure reduction at the point B with a certain payload on the vehicle. This function occurs because as the chassis frame 2 of a vehicle lies lower under a certain freight or load, causing the tension spring 4 to be extended to a certain extent, there is an increase in a pushing or urging effort working upon the plunger 6, thus making the fluid pressure to close the ball valve 16 increased to a corresponding extent to such an increased urging effect on the plunger.

In this manner, with thus-obtained effect of making an extent of increase in a braking force at the commencement of reducing the rate of braking effort upon the rear wheels accordingly with an increase in the current load of a vehicle, there will be no undesired results such as the occurrence of an accidental locking on the part of rear wheels under no payload of the vehicle or an insufficient braking effect under a certain load thereof.

This is a known advantageous aspect as attained from the operation of the conventional hydraulic fluid pressure control system incorporating the load-sensing proportion valve mechanism 1.

However, this system has the following problem which is inherent to the conventional construction of such a load-sensing proportion valve 1. That is, there exists a gap between the stem 18 and the lower end of the plunger 6 when a vehicle has no payload thereon. With the existence of this gap, when the vehicle uses its brake during the operation, there may very possibly be a chance of immediate contact between the stem 18 and the lower end 6b of the plunger 6, thus producing striking noises of contact between these members made of metal. Naturally, such noises would not only be disturbances to the stillness in the passengers' cabin, but also they would produce physical vibrations to be relayed to the brake pedal, which would very possibly be an impairment to the comfortableness in the vehicle's operation.

OBJECT AND SUMMARY OF THE INVENTION

In coping with such a problem inherent to the conventional construction of the load-sensing proportion valve mechanism, the present invention is essentially directed to the provision of an efficient solution to such problem. Therefore it is a primary object of the present invention to provide an improved construction of a load-sensing proportion valve which may effectively prevent the occurrence of undesired noises from possible contacts between the load-sensing lever stem and the plunger, accordingly.

It is another object of the invention to provide an improved load-sensing proportion valve which may essentially contribute to an improvement in the stillness or comfortableness of the passengers' cabin of a vehicle by virtue of the efficient effect of preventing noises from such possible contacts between the members in the load-sensing proportion valve.

The above-mentioned objects of the present invention can be attained from an improvement in construction of a load-sensing proportion valve mechanism including a control valve disposed on way of or in line with a hydraulic fluid passage extending from a brake master cylinder to rear wheel brake cylinders, a plunger adapted to close and open the control valve in response to the output fluid pressure from the brake master cylinder, and a stem formed integrally with the load-sensing lever and adapted to urge the plunger in the direction to open the control valve to an extent according to a current load of a vehicle, which further comprises, as summarized in brief, a resilient member provided in a position where the plunger and the stem come to abut with each other.

Other objects and advantages of the invention will now become more apparent to those skilled in the art, when considering the following detailed description of a preferred embodiment exemplifying the best mode of carrying out the invention as presently perceived. The detailed description refers particularly to the accompanying drawings, in which like parts are designated by like reference numerals.

DETAILED DESCRIPTION OF A PREFERRED EMBODIMENT

Figure 1:
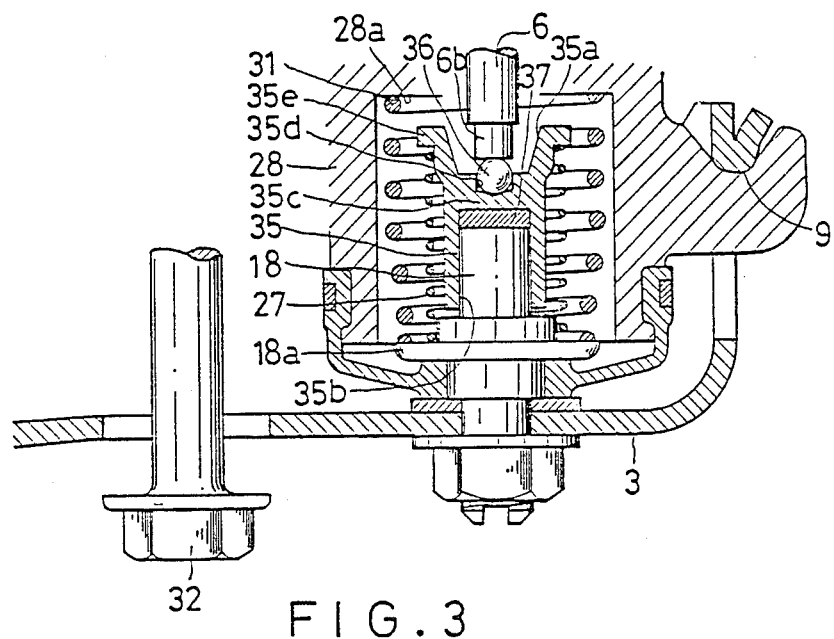
FIG. 1 is a longitudinal cross-sectional view showing the lower end part and therearound of a plunger incorporated in a load-sensing proportion valve mechanism according to the present invention by way of a preferred embodiment thereof.
Figure 3:
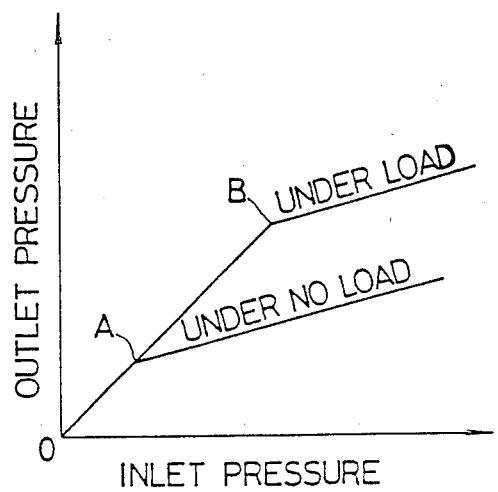
FIG. 3 is a graphic representation showing the mutual relationship between the inlet and outlet fluid pressures of the load-sensing proportion valve mechanism.

The present invention will now be explained in more detail by way of a preferred embodiment thereof in conjunction with FIG. 1. As shown in the drawing figure showing the lower part construction of the plunger 6 according to the invention, there is a cap 35 disposed atop the stem 18, so as to be slidable along the longitudinal axis of the stem 18. This cap 35 has recesses 35a and 35b formed in an opposed relationship on its both ends, and also a partition or bulkhead 35c and a recess or cavity 35d in the center of the upper wall of the bulkhead 35c for receiving a steel ball 36 in a resting position. On the other hand, there is provided a flange 35e in the outer circumference of the upper end of the cap 35 for receiving an auxiliary spring 27, which is interposed resiliently between the flange 35e and the flanged portion 18a of the stem 18 to render a biasing force therebetween, so that it may effect a minimum extent of urging force upon the plunger 6 to open the ball valve 16, particularly when the above-mentioned tension spring 4 is broken.

Also, there is mounted a rubber disc 37 serving as a resilient member in sandwiched fashion between the cap 35 the stem 18 in the recess 35b of the cap 35. With such arrangement, the rubber disc 37, the bulkhead 35c of the cap 35 and the ball element 36 are put together between the lower end 6b of the plunger 6 and the stem 18, so that they are in an operative engagement with each other.

In addition, there is provided a coiled spring 31 between the stepped portion 28a of the housing 28 and the flanged portion 18a of the stem 18, so that it may serve to afford a resilient force to cause the load-sensing lever 3 to be rotated downwardly or anti-clockwise about or with respect to the pivot point 9 as viewed in FIG. 1, in an emergency that the tension spring 4 happens to be broken.

Figure 2:
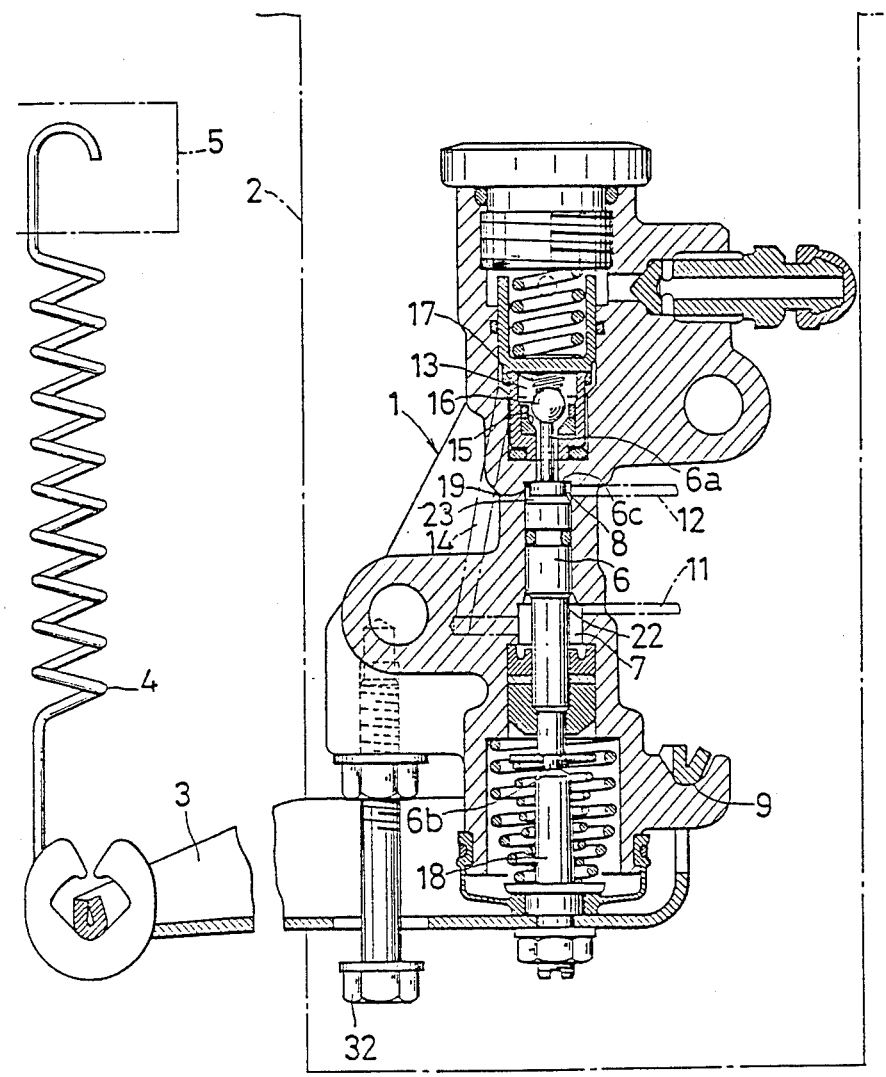
FIG. 2 is a similar cross-sectional view showing the general construction of a conventional load-sensing proportion valve mechanism.

As the construction of all other elements of the hydraulic fluid control mechanism by the employment of the load-sensing proportion valve is similar to those of the conventional system shown in FIG. 2, no further description will be presented for the sake of clarity.

With such an improvement in construction of the hydraulic fluid control mechanism for us in a vehicle's hydraulic brake system according to the present invention it is now seen in operation that the stem 18 and the plunger 6 are in an abutting relationship with each other through the rubber disc 37, the cap 35 and the ball element 36 set together in working position. Therefore, should the stem 18 happen to shift in swinging motions in the vertical directions under no braking condition of the vehicle, shock loads from such swinging motions may be buffered and absorbed by virtue of the rubber disc 37, thus preventing any noises from being generated from possible immediate contact between the stem 18 and the plunger 6, accordingly.

On the other hand, when the vehicle's brake is used, the urging force of the stem 18 is rendered upon the plunger 6 through the cushioning effect of the rubber disc 37, the cap 35 and the ball element 36 as done in the conventional construction. Consequently, the output fluid pressure from the brake master cylinder will then be subjected to a predetermined rate of reduction correspondingly to the extent of the current load of the vehicle, whereupon it is introduced to the rear wheel brake cylinders.

In this arrangement, the ball element 36 is provided essentially for eliminating any swinging moment of the stem 18 about the pivot point 9 from rendering upon the plunger 6.

While the present invention is described by way of a specific embodiment thereof, it is to be understood that the invention may be embodied in various ways without being restricted to this specific embodiment thereof, but many other modifications may be made without departing from the spirit of the invention. For instance, while the rubber disc 37 is employed as a resilient member in accordance with the specific embodiment, a spring washer or other like means may equally be adopted in place of this rubber disc 37.

In addition, the use of the cap 35 and the ball element 36 is not essential to the practice of the invention, but it may alternatively take any other means by way of modification in design. For instance, as an alternative the lower end of the cap 35 may be made to be cylindrical in shape, with this cylindrical portion being inserted slidably into an opening defined in the stem 18, and with a resilient member being disposed on the bottom of this opening. In place of the ball element 36, there may be provided a semi-spherical portion in the lower end surface of the plunger 6 in such a manner that it may make a point contact with the cap 35. Or else, in place of the cap 35 and the ball element 36, it can be designed in such a manner that the lower end 6b of the plunger 6 rests immediately upon the rubber disc 37, when so required.

According to the present invention, by virtue of such an improvement in construction that there is provided a resilient member intermediately of the stem and the plunger, the shock loads from immediate contact between the stem and the plunger may efficiently be buffered and absorbed by way of the resilient member, when in operation of the hydraulic brake of the vehicle, and consequently, noises from possible contacts therebetween may be prevented from occurring, or otherwise they may be unavoidable as in the conventional construction, which will contribute to an improvement in the stillness and/or the comfortableness of the passengers' cabin of the vehicle, accordingly.

Also, with this improvement in construction of the hydraulic fluid pressure control mechanism according to the present invention, the urging force of the stem may efficiently be rendered upon the plunger through the resilient member during the use of the hydraulic brake, so that the output fluid pressure from the master brake cylinder may properly be subjected to a due rate of reduction and relayed to the part of the rear wheel brake cylinders free from any impairment as in the conventional manner, at all.

It is also to be understood that the appended claimed are intended to cover all of such generic and specific features particular to the invention as disclosed herein and all statements relating to the scope of the invention, which as a matter of language might be said to fall thereunder.

What is claimed is:

1. A load sensing proportion valve for use with a vehicle, comprising: a control valve disposed in line with a hydraulic fluid passage extending from a master brake cylinder to rear wheel brake cylinders; a plunger element connected to said control valve for operating said control valve in response to the output fluid pressure from said master brake cylinder; a load sensing lever means; a stem connected to said load sensing lever means, said stem adapted to urge said plunger to open said control valve in accordance with the position of said load sensing lever means, the position of said load sensing lever means being a function of a current load of the vehicle; a cap having at least a first recess and a second recess, said stem being positioned in one of said first and second recesses; resilient means positioned in one of said first and second recesses for damping forces applied thereto; a ball means positioned in the other of said first and second recesses, said stem and said plunger coming into and out of opposed engagement with each other through said resilient means; said cap means including bulkhead means surrounding said stem portion; and, spring means connected to said cap and said stem for urging said cap means toward said plunger.

2. A load-sensing proportion valve as claimed in claim 1, wherein said resilient means comprises a rubber or synthetic resin disc.

3. A load sensing proportion valve as claimed in claim 1, wherein said cap means includes a lower end and an upper end, the lower end portion of said cap means being formed cylindrical in shape forming said second recess, said stem being insertable into said second recess of said cylindrical lower end portion of said cap means, said resilient means being disposed on the bottom of said second recess, said ball means being set in a working position in the upper end in said first recess of said cap means.

4. A load sensing proportion valve construction for use with a vehicle of variable load, comprising: a control valve disposed in line with a hydraulic fluid passage extending from a master brake cylinder to a rear wheel brake cylinder; a plunger element connected to said control valve for operating said control valve in response to the output fluid pressure from said master brake cylinder; a load sensing lever means lying in a position, said position being dependent upon a current load of the vehicle; a stem connected to said load sensing lever means and positionable in response to the position of said load sensing lever means, said stem adapted to urge said plunger to open said control valve in accordance with the position of said load sensing lever means; a cap having at least a first recess and a second recess, said stem being positioned in one of said first and second recesses; resilient means positioned in one of said first and second recesses for damping forces applied thereto; ball means positioned in the other of said first and second recesses for making a point contact with said cap and plunger, said stem and said plunger coming into and out of opposed engagement with each other through said resilient means and said ball means; and, spring means connected to said cap and said stem for urging said cap means toward said plunger.

5. A load sensing proportion valve construction for use with vehicles of variable load having a hydraulic fluid passage extending from a master brake cylinder to rear wheel brake cylinders, comprising: a control valve disposed in line with the hydraulic fluid passage; a plunger element connected to said control valve for opening said control valve in response to the output fluid pressure from the master brake cylinder; a load sensing lever means positionable in one of a plurality of positions in dependence upon a current load of the vehicle; a stem supported on said load sensing lever means for movement therewith, said stem adapted to urge said plunger to open said control valve in accordance with the position of said load sensing lever means; a cap member having a first recess at an upper portion and a second recess defined by a lower cylindrical portion, said stem being positioned in said second recess; resilient means positioned in said second recess between said stem and said cap member, for damping forces between said stem portion said cap member; ball means positioned in said first recess for eliminating any swinging movement of said stem with respect to a pivot of said load sensing lever means, said stem and said plunger coming into and out of opposed engagement with each other through said resilient means, said cap member and said ball means; and, a spring engaging a flange member associated with said stem and engaging a flange member associated with said cap for urging said cap away from said stem toward said plunger.

* * * * *